April 1, 1930.        C. D. AMMON            1,752,290
              HAMMER MILL FEED GRINDER
                  Filed June 1, 1929

Inventor
Chas. D. Ammon

By  Emil F. Lange
              Attorney

Patented Apr. 1, 1930

1,752,290

UNITED STATES PATENT OFFICE

CHARLES D. AMMON, OF LINCOLN, NEBRASKA

HAMMER MILL FEED GRINDER

Application filed June 1, 1929. Serial No. 367,695.

My invention relates to hammer mill feed grinders, its object being the provision of a sturdy construction which is free from most of the defects found in the present feed grinders.

An important object of my invention is the provision of a unitary reel assembly which is capable of easy assembly or disassembly.

Another of my objects is the provision of a unitary assembly of all of the rotating parts of the mill, including not only the reel but the shaft, pulleys and collars.

Still another object which I have in view is the provision of devices for preventing finely ground feed from passing out through the bearings.

Figure 1:
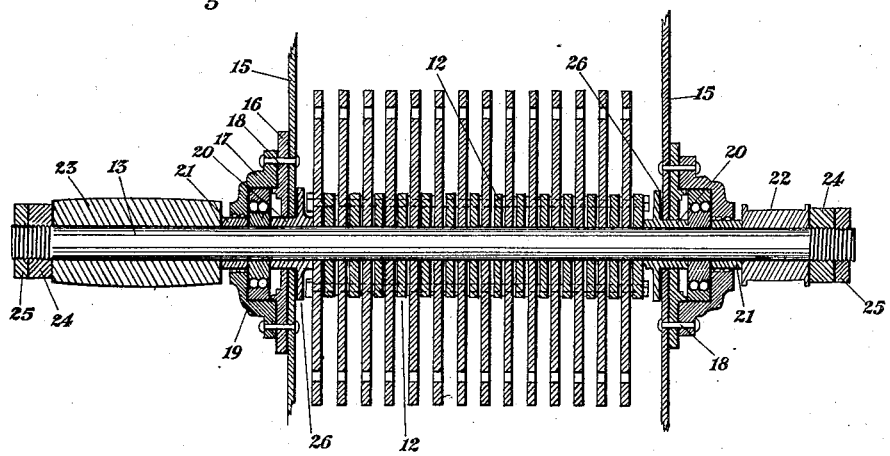

Having in view these objects and others which will be pointed out in the following description, I will now refer to the drawings, in which Figure 1 is a median vertical sectional view through the reel, casing, bearings and pulleys.

Figure 2:
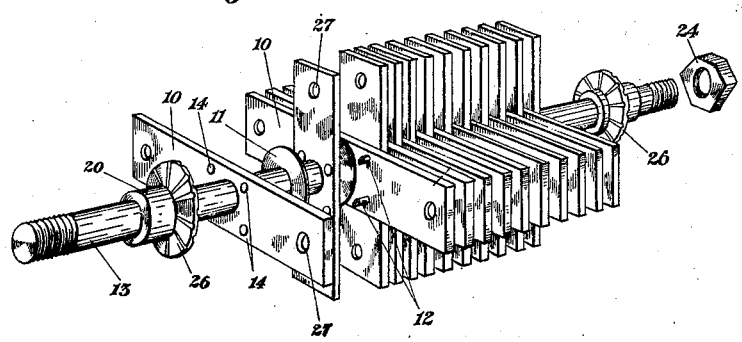

Figure 2 is a perspective view of the reel assembly in partly disassembled relation and of the shaft with the devices for preventing finely ground material from passing out of the mill through the bearings.

The reel consists of a plurality of plates 10 spaced by means of washers 11 and are held together by means of connecting rods 12. The plates are rectangular in form and they are each provided with a plurality of apertures in perfect symmetry with regard to both the longitudinal and transverse axes of the plates. Each plate has a central aperture for the reception of the shaft 13, and surrounding this aperture are four apertures 14 which are arranged in the form of the corners of a square and in symmetry with the central aperture. The apertures 14 are designed for receiving the connecting rods 12. The washers 11 are provided with central apertures for receiving the shaft 13 and their external diameter is slightly less than the diagonal distance between two apertures 14. The reel is assembled by arranging the plates 10 in crisscross relation on the connecting rods 12 with washers 11 interposed between each two consecutive plates.

The assembly of the reel is an easy matter because of the symmetry of the plates 10. The workman merely picks up the plates 10 and threads them on to the rods 12 in crisscross relation. Between each two plates he drops a washer 11 which automatically centers itself between the four connecting rods 12. The result is that in the assembled reel the central apertures of all of the plates 10 and of all of the washers 11 are in perfect alignment for receiving the shaft 13.

The two walls of the mill casing are indicated by the numeral 15. My reel assembly is so designed that it may be secured to a shaft passing through apertures in opposite walls 15 of the mill casing without necessitating any hinged or seam structure in the walls to permit assembly and disassembly. Secured to each of the walls are two bearing members 16 and 17, these members being secured to the wall by means of rivets or other suitable fastening devices 18. The bearing members 16 and 17 both surround the shaft and leave an open annular space for the ball housing 19. The collar 20 passes through one wall 15 and through the bearing member 16 while the collar 21 passes through the bearing member 17. Both collars 20 and 21 are brought against the ball housing 19. The collars 20 and 21 are each provided with central apertures having the same diameter as those of the plates 10 and the washers 11.

The shaft 13 is smooth throughout except at its end portions which are screw threaded. In assembling the reel in the mill, the shaft 13 is passed through the pulleys 22 and 23, through the sleeves 20 and 21 and through the central aperture in the reel assembly. The nuts 24 and 25 are then tightened which creates a thrust from end to end on the two pulleys and on the sleeves and on the reel assembly so that all of the rotatable portions of the mill constitute a single unit.

Considerable difficulty is encountered in mills of this type with the finely ground material passing out through the bearings of the drive shaft. In order to overcome this difficulty, I provide means for engaging the flour immediately before it reaches the bearings, the means being so designed as to throw the flour back into the mill. These means are best shown in Figure 2 which in the present instance comprise flanges 26 on the sleeves 20, the flanges being positioned on the inner side of the walls 15. Each flange 26 is provided with a plurality of radial grooves on opposite faces as shown in Figure 2. Under the rapid rotation of the reel the finely ground material which reaches the flanges 26 is hurled radially, this movement being caused partly by centrifugal force and partly by the powerful air currents moving in radial directions from the shaft. It is very difficult for this finely ground material to creep in between the flange 26 and the wall 15 but the little flour that does creep in is immediately hurled outwardly so that it cannot reach the bearings.

From the foregoing description it will be apparent that the reel assembly constitutes a firm unit and that it may be removed from the mill as a unit by simply withdrawing the shaft 15 after releasing the nuts 24 and 25. The reel assembly as a unit will then fall to the bottom of the mill where it may be withdrawn through the opening provided for the removal of the ground feed. When the bolts on the connecting rods 13 are tightened, all of the plates and washers are firmly anchored together.

The hammer mill type of mill is so well known that the features common to all mills of this type do not require extended description. In the present instance, the plates 10 are provided with apertures 27 which are symmetrically positioned in the end portions of the plates. The hammers, not shown, are easily connected to the reel between adjoining plates by means of pivot pins passing through the aligned apertures 27.

Having thus described my invention in such full, clear, and exact terms that its construction and operation will be readily understood by others skilled in the art to which it pertains, what I claim as new and desire to secure by Letters Patent of the United States is:

1. A reel assembly for hammer mills including a plurality of plates arranged in crisscross relation and having central shaft apertures, a plurality of rods connecting said plates and holding them in fixed relation to each other whereby said reel assembly will remain as a unit when the central shaft is withdrawn therefrom, and releasable means on said rods for holding said plates in clamped relation between the extremities of said rods whereby said reel assembly may be readily assembled and disassembled.

2. A reel assembly for hammer mills including a plurality of plates arranged in crisscross relation and having central shaft apertures, a plurality of rods connecting said plates, said rods being each equidistantly spaced from the central apertures of said plates and being also equidistantly spaced from each other, and releasable means on said rods for holding said plates in clamped relation between the extremities of said rods whereby said reel assembly may be readily assembled and disassembled.

3. A reel assembly for hammer mills including a plurality of plates arranged in crisscross relation an dhaving central shaft apertures, a plurality of rods connecting all of said plates, said rods being arranged concentrically with respect to the central shaft apertures of said plates, releasable means on said rods for holding said plates in clamped relation between the extremities of said rods whereby said reel assembly may be readily assembled and disassembled, and a plurality of circular spacing washers between said plates.

4. A reel assembly for hammer mills including a plurality of plates arranged in crisscross relation and having central shaft apertures, four rods each connecting all of said plates, said rods being each equidistantly spaced from the central apertures of said plates and being also equidistantly spaced from each other, releasable means on said rods for holding said plates in clamped relation between the extremities of said rods whereby said reel assembly may be readily assembled and disassembled, and a plurality of spacing washers between said plates, said washers having an external diameter substantially equal to the diagonal distances between said rods.

5. In combination with a unitary reel assembly consisting of a plurality of plates secured together in crisscross and spaced apart relation, a drive shaft passing centrally through said reel assembly, said drive shaft adapted to be passed through bearings in opposite walls of the mill casing with the reel assembly positioned between the casing walls, a plurality of members surrounding said shaft at opposite extremities of said reel assembly, and nuts on each end portion of said drive shaft, said nuts being adapted to clamp said members and said reel assembly onto said shaft whereby said members and said reel assembly will rotate as a unit with said drive shaft.

6. In a mill, a shaft having a bearing in a wall of the mill casing, and an annulus surrounding said shaft and rotatable therewith, said annulus being positioned in proximity to the inner surface of said casing wall and being spaced from both the reel assembly and the casing wall at a distance sufficient for both surfaces thereof to exert centrifugal force to drive the ground particles through an unobstructed path.

7. In a mill, a shaft having thereon a collar rotatable therewith, said collar passing through an aperture in a wall of the mill casing, and an annular flange projecting radially from the inner edge of said collar, said flange being in close proximity to the inner surface of said casing wall and being spaced from both the reel assembly and the casing wall at a distance sufficient for both surfaces thereof to exert centrifugal force to drive the ground particles through an unobstructed path.

8. In a mill, a shaft having thereon a collar rotatable therewith, said collar passing through an aperture in a wall of the mill casing, and an annular flange projecting radially from the inner edge of said collar, said flange being in close proximity to the inner surface of said casing wall, said flange being provided with radial grooves in both faces thereof.

In testimony whereof I affix my signature.

CHARLES D. AMMON.